(12) United States Patent
Lee et al.

(10) Patent No.: US 7,269,799 B2
(45) Date of Patent: Sep. 11, 2007

(54) METHOD FOR DEVELOPING ADAPTIVE MENUS

(75) Inventors: Dong Seok Lee, Daejon (KR); Wan Chul Yoon, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 785 days.

(21) Appl. No.: 10/198,320

(22) Filed: Jul. 18, 2002

(65) Prior Publication Data

US 2003/0038848 A1 Feb. 27, 2003

(30) Foreign Application Priority Data

Aug. 23, 2001 (KR) ................................ 2001-51018

(51) Int. Cl.
*G06F 17/00* (2006.01)
(52) U.S. Cl. ...................... 715/810; 715/824; 715/845; 715/764; 715/866
(58) Field of Classification Search ................ 715/825, 715/845, 824, 810, 866, 764
See application file for complete search history.

(56) References Cited

U.S. PATENT DOCUMENTS 5,625,783 A * 4/1997 Ezekiel et al. .............. 719/320
5,644,738 A * 7/1997 Goldman et al. ........... 715/825
6,121,968 A * 9/2000 Arcuri et al. ............... 715/825
6,493,006 B1 * 12/2002 Gourdol et al. ............. 715/825

OTHER PUBLICATIONS

Stuart K. Card and Thomas P. Moran, The Keystoke-Level Model for User Performance Time with Interactive Systems, ACM, Jul. 1980, vol. 23, p. 400.*
Stuart K. Card and Thomas P. Moran, User Technology: From Pointing to Pondering, ACM, 1986, p. 188.*

* cited by examiner

*Primary Examiner*—John Cabeca
*Assistant Examiner*—Sabrina Greene
(74) *Attorney, Agent, or Firm*—Harness, Dickey & Pierce, PLC

(57) ABSTRACT

The present invention relates to a method for adaptive menu design and items presentation reflecting cognitive characteristics. More particularly, the present invention relates to a technique to provide menu items reflecting human cognitive characteristics so as to apply for computer OS, the Internet browsers, and personal data assistants (PDAs) as well as computer programs.

3 Claims, 1 Drawing Sheet

METHOD FOR DEVELOPING ADAPTIVE MENUS

BACKGROUND OF THE INVENTION

1. Field of the Invention

The present invention relates to a method for adaptive menu design and items presentation reflecting cognitive characteristics. More particularly, the present invention relates to a technique to provide menu items reflecting human cognitive characteristics so as to apply for computer OS, the Internet browsers, and personal data assistants (PDAs) as well as computer programs.

2. Description of the Related Art

In recent years, number of available functions of computer programs has increased dramatically. This has caused menu items of computer programs to increase and the trend of this increase is expected to keep growing. For example, although the mobile phones in the early days had only a few tens of functions, those on sale these days have more than a hundred of functions.

This increase of menu items causes the cognitive burden for using computer programs to increase so that it obstructs initial learning of novice users and familiarization of middle-level users. This increase in number of functions now limits efficiency of menu items display method. However, according to the research by A. Sears of which result presented in "The Split Menus," *ACM Transactions on CHI*, 1(1), pp. 27-51 (1995), only 2 or 3 of frequently accessed menu items are known to occupy as much as 70 to 90 percent of the total usage.

Although many have taken researches on menu item presentation techniques to reduce cognitive burden of users based on this factual property, human cognitive ability has not been so fully reflected to the extent of users satisfaction.

One of the techniques to display frequently accessed menus items was presented in U.S. Pat. No. 5,897,670 applied in 1996 with title of "Method and system for efficient organization of selectable elements on a graphical user interface." In this prior art, frequently accessed menus items are displayed at the top of the menu. Therefore, as the frequency of the menu items changes, the positions of items in the menu change accordingly. This increases users' cognitive burden because the menu positions that are learned through the use of program change. Although the exact menu position is not purposely memorized, but it is left in the user's memory through learning process.

Another in the prior art is the menu item display technique as provided in Microsoft Windows 2000 and Office 2000 that appears in U.S. Pat. No. 6,121,968 applied in 1998. In this technique, a subset list of frequently accessed menus items is provided initially, and the complete list of items is provided after operating a button or a certain period of user time. This technique allows select frequently accessed items in a short period of time and clarifies what are the selected items. However, selection process for items of infrequent access is too bothersome for user's satisfaction. Also, the role of menu item display that makes users familiarized with the system functions even if not available for use is not fully exercised. Indeed, many users of Microsoft Windows 2000 and Microsoft Office 2000 do not like this type of menus.

As other research results, there are proposed techniques in the prior art by A. Sears in "The Split Menus," *ACM Transactions on CHI*, 1(1), pp. 27-51 (1995) and by G. Kurtenbachin "The Hot Box," *Proceedings of CHI, pp.* 231-237, ACM: New York (1999). 'Split Menu' causes confusion to users if the frequency of menu items changes. 'Hot Box' is a method to present a large number of items and the purpose is different from that of the present invention. Although the results of these researches are not known to dissatisfy users, they are not so useful from lack of consideration of human cognitive characteristics.

SUMMARY OF THE INVENTION

The present invention is to resolve the aforementioned problems in the prior art. It is an object of the present invention to provide a method for displaying menu items where the menu items do not change their display positions and some prioritized menus items, such as frequently used or important items, are presented easy-to-recognize and easy-to-select.

Another object of the invention is to make users familiarized with menu items so as to incur no confusion even with the changes of prioritized menus items.

To achieve the objects of the present invention, the present invention provides a menu design and items display method reflecting human cognitive characteristics to present some prioritized menu items with providing visual affordance first. The method comprising the steps of: selecting some items from the menu items by selection criteria such as frequency; presenting only the selected items at their own positions in the display; presenting the remaining items at their positions after a certain lapse of time; working on the system by perceiving users' selection; and recording the users' selection to update the priorities of items.

Here, prioritized menu items include some important items, frequently accessed items, or are selected by considering the context of user operations.

The above and other features and advantages of the present invention will be more clearly understood for those skilled in the art from the following detailed description in conjunction with the accompanying drawing, which forms a part of this disclosure.

DETAILED DESCRIPTION OF THE EMBODIMENT

Figure 1:
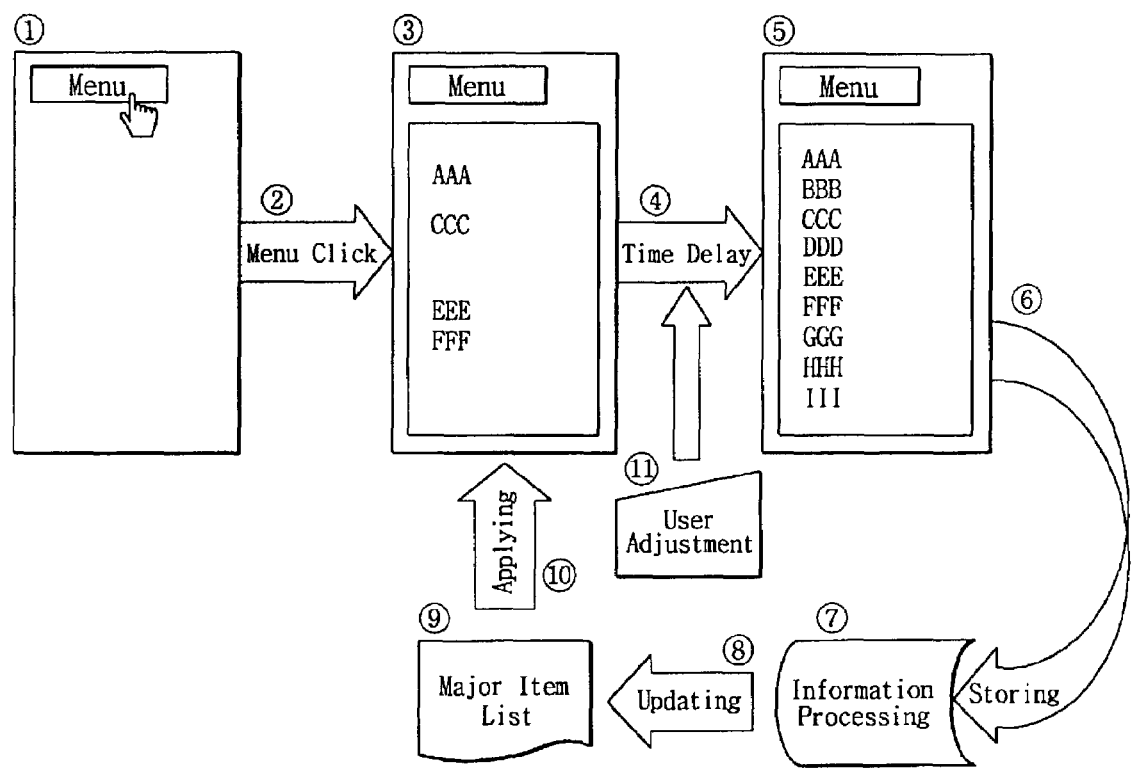
FIG. 1 is a block diagram illustrating the menu design and item presentation process reflecting human cognitive characteristics.

Hereinafter, the constitution and operation of the present invention is described in detail through preferred embodiments by referring to the accompanying drawing.

FIG. 1 illustrates how the menu designed according to the present invention presents menu items and how the current result is used for the next presentation.

Referring to FIG. 1, in case of using menu, a user clicks (2) the button of graphic user interface (1) to activate the menu. Some prioritized menu items appear at their positions first (3) and after a certain lapse of time (4) the remaining items are presented (5). If the user finds an intended item during this process, he or she can select that item at that point of time. This process is recorded (6,7) to manage the prioritized items (8,9,10) and the user can personally adjust the time interval (11).

In other words, in this invention, the menu items provided by computer programs are displayed in the graphic user interface throughout two stages. If the user clicks the button to activate the menu, at the first stage some prioritized menu items are presented at their own positions and the remaining items are not displayed yet. After a certain lapse of time the second stage begins. At this second stage the remaining items that did not appear at the first stage do appear at their positions. On completing the two stages, the whole items come to be displayed at their own positions.

The time interval between the first and the second stages should be determined considering the user's cognitive characteristics. It must be greater than at least 0.17 seconds, because the sum of perception time and cognition time is in the range of 0.15 to 0.17 seconds. This time interval needs be adjusted depending on the user's level and the user can adjust it personally. However, it must not be greater than 3 seconds because the cognitive endurance limit is known to be in the range of 2 to 3 seconds.

'Some prioritized menu items' that are displayed first at the first stage are selected based on frequency of access, importance, or by referencing the context of user's operations. All user operations are recorded, managed, updated, and then reflected again for selecting 'some prioritized menu items'.

As an alternative embodiment of the present invention, the remaining items other than 'some prioritized menu items' may appear not at a later time, but appear in "light gray" first and turn into "black" after a certain lapse of time, i.e., after 0.17 to 3 seconds. This will allow users to discern priority of the items visually.

A menu design and items presentation method reflecting human cognitive characteristics in accordance with the present invention is proposed as a new method to present menu items available in computer programs, where some important or frequently accessed items that are selected using human cognitive property are presented in advance by a certain period of time. This method has the following advantageous effects.

- It supports efficiently both initial learning of novice users and menu selection work for proficient users.
- It eliminates potential confusion that may arise from the cases where prioritized accessed items change.
- It does not incur cause of users' dissatisfaction through indirect user support.
- It does not hide or fold down menu items but present prioritized accessed items first for user's cognitive convenience.
- It does not rearrange prioritized menu items into other top positions.

Therefore, by using the menu design method in accordance with the present invention, users can reduce the time for menu item selection. The invention makes users to recognize and consider the selected items first and efficiently supports learning of novice users. The user satisfaction with these features will consequently lead to improvement of the product image and reduce the cost for product manufacturing and maintenance.

Although the present invention for menu design and items presentation method reflecting human cognitive property has been described along with the accompanying drawing, this only illustrates preferred embodiments but not limits the scope of the present invention. It will be apparent for those skilled in the art that various modifications may be made without departing from the spirit and scope of the present invention as defined by the appended claims.

What is claimed is:

1. A menu design and items presentation method reflecting human cognitive characteristics to present some prioritized menu items in the menu item display with providing visual affordance first, said method comprising the steps of:
   selecting some prioritized items from the menu items by selection criteria;
   presenting only the selected items at their own positions in the display;
   presenting the remaining items at their positions after a certain lapse of time;
   wherein the certain lapse of time is adjustable by a user of the menu items;
   working on the system by perceiving user's operation; and
   recording the user's operation to update the priorities of the menu items,
   wherein the remaining items appear in a light color first and then turn into a darker color after 0.17 to 3 seconds.

2. A menu design and items presentation method reflecting human cognitive characteristics to present some prioritized menu items in the menu item display with providing visual affordance first, said method comprising the steps of:
   selecting some prioritized items from the menu items by selection criteria;
   presenting only the selected items at their own positions in the display;
   presenting the remaining items at their positions after a certain lapse of time;
   wherein the certain lapse of time is adjustable by a user of the menu items;
   working on the system by perceiving user's operation; and
   recording the user's operation to update the priorities of the menu items,
   wherein the certain lapse of time having a minimum value in the range of 0.15 to 0.17 seconds, and the remaining items appear in a light color first and then turn into a darker color after 0.17 to 3 seconds.

3. A menu design and items presentation method reflecting human cognitive characteristics to present some prioritized menu items in the menu item display with providing visual affordance first, said method comprising the steps of:
   selecting some prioritized items from the menu items by selection criteria;
   presenting only the selected items at their own positions in the display;
   presenting the remaining items at their positions after a certain lapse of time;
   wherein the certain lapse of time is adjustable by a user of the menu items;
   working on the system by perceiving user's operation; and
   recording the user's operation to update the priorities of the menu items,
   wherein the certain lapse of time is in the range of 2 to 3 seconds, and the remaining items appear in a light color first and then turn into a darker color after 0.17 to 3 seconds.

* * * * *